(12) United States Patent
Limarga et al.

(10) Patent No.: US 9,908,818 B2
(45) Date of Patent: Mar. 6, 2018

(54) METHOD FOR PROVIDING CRYSTALLINE SILICON-CONTAINING CERAMIC MATERIAL

(71) Applicant: United Technologies Corporation, Hartford, CT (US)

(72) Inventors: Andi M. Limarga, Cupertino, CA (US); Paul Sheedy, Bolton, CT (US); Wayde R. Schmidt, Pomfret, CT (US); Douglas M. Berczik, Mnachester, CT (US); Tania Bhatia Kashyap, West Hartford, CT (US); Mark A. Hermann, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/027,705

(22) PCT Filed: Sep. 24, 2014

(86) PCT No.: PCT/US2014/057091
§ 371 (c)(1),
(2) Date: Apr. 7, 2016

(87) PCT Pub. No.: WO2015/053937
PCT Pub. Date: Apr. 16, 2015

(65) Prior Publication Data
US 2016/0236986 A1    Aug. 18, 2016

Related U.S. Application Data

(60) Provisional application No. 61/888,167, filed on Oct. 8, 2013.

(51) Int. Cl.
*C04B 35/571* (2006.01)
*C04B 35/58* (2006.01)
*C04B 35/80* (2006.01)

(52) U.S. Cl.
CPC .......... *C04B 35/571* (2013.01); *C04B 35/58* (2013.01); *C04B 35/806* (2013.01);
(Continued)

(58) Field of Classification Search
CPC ..... C04B 35/571; C04B 35/806; C04B 35/58; C04B 2235/616; C04B 2235/3821;
(Continued)

(56) References Cited

U.S. PATENT DOCUMENTS 4,081,284 A * 3/1978 Prochazka ............ C04B 35/565
501/91
5,376,599 A   12/1994 Oshima et al.
(Continued)

FOREIGN PATENT DOCUMENTS

KR    1019890012910 A    9/1989

OTHER PUBLICATIONS

Chew, et al., Processing Aluminum Nitride-Silicon Carbide Composites via Polymer Infiltration and Pyrolysis of Polymethylsilane, a Precursor to Stoichiometric Silicon Carbide, J. Am. Ceram. Soc. 1999; 82(4): 857-866.*

(Continued)

*Primary Examiner* — Daniel C McCracken
(74) *Attorney, Agent, or Firm* — Carlson, Gaskey & Olds, P.C.

(57) ABSTRACT

Disclosed is a method for providing a crystalline ceramic material. In an example, the method includes providing a silicon-containing preceramic polymer material that can be thermally converted to one or more crystalline polymorphs. The silicon-containing preceramic polymer material includes dispersed therein an effective amount of dopant particles. The silicon-containing preceramic polymer material is then thermally converted to the silicon-containing ceramic material. The effective amount of dopant particles (Continued)

enhance the formation of at least one of the one or more crystalline polymorphs, relative to the silicon-containing preceramic polymer without the dopant particles, with respect to at least one of formation of a selected polymorph of the one or more crystalline polymorphs formed, an amount formed of a selected polymorph of the one or more crystalline polymorphs formed, and a temperature of formation of the one or more crystalline polymorphs.

12 Claims, 1 Drawing Sheet

(52) U.S. Cl.
CPC .. *C04B 2235/383* (2013.01); *C04B 2235/386* (2013.01); *C04B 2235/3821* (2013.01); *C04B 2235/3852* (2013.01); *C04B 2235/3865* (2013.01); *C04B 2235/3873* (2013.01); *C04B 2235/422* (2013.01); *C04B 2235/425* (2013.01); *C04B 2235/427* (2013.01); *C04B 2235/5244* (2013.01); *C04B 2235/5288* (2013.01); *C04B 2235/5454* (2013.01); *C04B 2235/616* (2013.01)

(58) Field of Classification Search
CPC ...... C04B 2235/383; C04B 2235/3852; C04B 2235/386; C04B 2235/3865; C04B 2235/422; C04B 2235/425; C04B 2235/427; C04B 2235/5244; C04B 2235/5288; C04B 2235/5454

See application file for complete search history.

(56) References Cited

U.S. PATENT DOCUMENTS

| | | |
|---|---|---|
| 6,133,396 A | 10/2000 | Laine et al. |
| 6,350,713 B1 | 2/2002 | Petrak |
| 6,743,393 B1 | 6/2004 | Petrak |
| 2009/0264273 A1 | 10/2009 | Riedell et al. |
| 2013/0085057 A1 | 4/2013 | Schmidt et al. |
| 2013/0122763 A1 | 5/2013 | Fish et al. |

OTHER PUBLICATIONS

The International Preliminary Report on Patentability for PCT Application No. PCT/US2014/057091, dated Apr. 21, 2016.
International Search Report and The Written Opinion for Application No. PCT/US2014/057091 dated Jan. 22, 2015.
Supplementary European Search Report for European Patent Application No. 14852865.6 completed May 30, 2017.

* cited by examiner

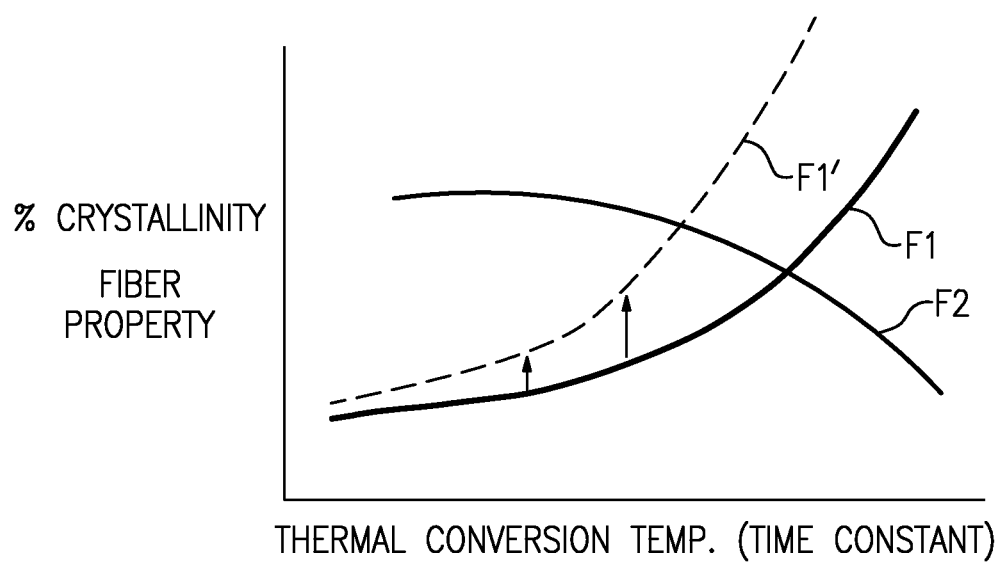

METHOD FOR PROVIDING CRYSTALLINE SILICON-CONTAINING CERAMIC MATERIAL

CROSS-REFERENCE TO RELATED APPLICATION

This application claims priority to U.S. Provisional Application No. 61/888,167, filed Oct. 8, 2014.

BACKGROUND

This disclosure relates to silicon-containing ceramic materials. Silicon-containing ceramic materials are known and used in articles that are subject to relatively severe conditions, such as gas turbine engine components. These ceramic materials can be fabricated using one of various known ceramic processing techniques. One technique is known as polymer infiltration and pyrolysis ("PIP"). The PIP technique involves a thermal conversion of a silicon-based polymer material to a ceramic char under a controlled atmosphere.

SUMMARY

A method for providing a crystalline ceramic material according to an example of the present disclosure includes providing a silicon-containing preceramic polymer material that can be thermally converted to one or more crystalline polymorphs. The silicon-containing preceramic polymer material includes dispersed therein an effective amount of dopant particles. The silicon-containing preceramic polymer material is then thermally converted to the silicon-containing ceramic material. The effective amount of dopant particles enhance the formation of at least one of the one or more crystalline polymorphs, relative to the silicon-containing preceramic polymer without the dopant particles, with respect to at least one of formation of a selected polymorph of the one or more crystalline polymorphs formed, an amount formed of a selected polymorph of the one or more crystalline polymorphs formed, and a temperature of formation of the one or more crystalline polymorphs.

In a further embodiment of any of the foregoing embodiments, the dopant particles are carbon-containing particles.

In a further embodiment of any of the foregoing embodiments, the carbon-containing particles are alpha silicon carbide.

In a further embodiment of any of the foregoing embodiments, the carbon-containing particles are selected from the group consisting of boron carbide, nano-diamond, graphite, graphene, activated carbon, carbon nanotubes, and combinations thereof.

In a further embodiment of any of the foregoing embodiments, the dopant particles are nitride particles.

In a further embodiment of any of the foregoing embodiments, the nitride particles are selected from the group consisting of aluminum nitride, gallium nitride, boron nitride, silicon nitride, and combinations thereof.

In a further embodiment of any of the foregoing embodiments, the silicon-containing ceramic material is silicon carbide.

In a further embodiment of any of the foregoing embodiments, the silicon-containing ceramic material is a silicon-carbon ceramic compound including an element selected from the group consisting of nitrogen, boron, oxygen and combinations thereof.

In a further embodiment of any of the foregoing embodiments, the silicon-containing preceramic polymer material includes, by weight, up to 40% of the dopant particles.

In a further embodiment of any of the foregoing embodiments, the silicon-containing preceramic polymer material includes, by weight, up to 20% of the dopant particles.

In a further embodiment of any of the foregoing embodiments, the silicon-containing preceramic polymer material includes, by weight, up to 10% of the dopant particles.

In a further embodiment of any of the foregoing embodiments, the silicon-containing preceramic polymer material includes, by weight, up to 5% of the dopant particles.

In a further embodiment of any of the foregoing embodiments, the silicon-containing ceramic material is silicon carbide, the silicon-containing preceramic polymer material includes, by weight, up to 10% of the dopant particles, the dopant particles are silicon carbide, and the silicon-containing preceramic polymer material is disposed within pores of a silicon carbide fiber structure.

A method for enhancing crystallinity and limiting thermal damage in formation of a reinforced silicon-containing ceramic material according to an example of the present disclosure includes providing a porous structure and a silicon-containing preceramic polymer material. The silicon-containing preceramic polymer material is thermally convertible into a silicon-containing ceramic material, wherein a percent crystallinity of the silicon-containing ceramic material is a function F1 of a temperature and time at which the silicon-containing preceramic polymer material is thermally converted. A degree of thermal damage to the porous structure is a function F2 of the temperature and the time at which the silicon-containing preceramic polymer material is thermally converted. The silicon-containing preceramic polymer material is provided with dopant particles dispersed therein to shift upwards the function F1 of the percent crystallinity. The pores of the porous structure are infiltrated with the silicon-containing preceramic polymer material having the dopant particles dispersed therein, and the silicon-containing preceramic polymer material is thermally converted, at the temperature and given time, to a crystalline silicon-containing ceramic material.

In a further embodiment of any of the foregoing embodiments, the dopant particles are carbon-containing particles.

In a further embodiment of any of the foregoing embodiments, the dopant particles are nitride particles.

In a further embodiment of any of the foregoing embodiments, the silicon-containing preceramic polymer material includes, by weight, up to 10% of the dopant particles.

A method for providing a crystalline ceramic material according to an example of the present disclosure includes providing a silicon-containing preceramic polymer material that is thermally convertible to one or more of multiple crystalline polymorphs including a first crystalline polymorph and a second crystalline polymorph. The silicon-containing preceramic polymer material includes dispersing therein crystal-specific dopant particles predominantly having the first crystalline polymorph, and thermally converting the silicon-containing preceramic polymer material to a silicon-carbon ceramic material. The crystal-specific dopant particles enhances, relative to the silicon-containing preceramic polymer without the crystal-specific dopant particles, the formation of the silicon-carbon ceramic matrix in the first crystalline polymorph.

In a further embodiment of any of the foregoing embodiments, the silicon-carbon ceramic material is silicon carbide, the first crystalline polymorph is an alpha polymorph of silicon carbide, the second crystalline polymorph is a beta polymorph of silicon carbide, and the crystal-specific dopant particles are silicon carbide particles predominantly having the alpha polymorph.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates a graphical representation of the shifting effect on crystallinity of dopant particles in a preceramic polymer.

DETAILED DESCRIPTION

Disclosed herein is a method, and variations thereof, that can be used to enhance properties of a silicon-containing ceramic material derived from a silicon-containing preceramic polymer material. Silicon-containing ceramic material can be used as a monolithic body or in a composite with other materials. For example, a ceramic matrix composite can include the silicon-containing ceramic material as a matrix with respect to a dispersed phase or structure, such as a porous body or fiber structure.

Silicon-containing ceramic materials can be used in a particular article for good performance in severe conditions, structural stability and thermal conductivity. These properties are tied to the microstructure of the silicon-containing ceramic material, and thus are also tied to the processing of the preceramic polymer that yields the microstructure. For example, silicon-containing ceramic materials can be polymorphic. The polymorphism, and more specifically the type of crystalline polymorph and percentage of the crystalline polymorph, controls the properties of the ceramic material.

Additionally, one challenge in fabricating the silicon-containing ceramic material is that the polymorphic microstructure of silicon-containing ceramic materials is sensitive to the thermal conversion conditions of the preceramic polymer with respect to temperature and time. Thus, factors that limit the thermal conversion conditions can ultimately debit the properties of the silicon-containing ceramic material. For example, given thermal conversion conditions that produce good properties of the silicon-containing ceramic material can thermally damage a dispersed phase or structure in the silicon-containing ceramic material, resulting in lower properties of the dispersed phase or structure. Thus, the thermal conversion conditions are selected to strike an acceptable balance between properties of the ceramic material and the properties of the dispersed phase or structure. Under such a paradigm, improvement in the properties of the silicon-containing ceramic material necessarily comes at the loss of properties of the dispersed phase or structure, and vice versa. However, as will described below, the disclosed method, and variations thereof, permits improvement in properties of the silicon-containing ceramic material with less limitation on the thermal conversion conditions of the preceramic polymer and without necessarily sacrificing properties of a dispersed phase or structure.

An example method for providing a crystalline silicon-containing ceramic material includes providing a silicon-containing preceramic polymer material that can be thermally converted to one or more crystalline polymorphs. The thermal conversion can be conducted in a controlled environment, such as under vacuum or under a blanket flow of argon, for example.

The silicon-containing preceramic polymer material is selected in accordance with the desired silicon-containing ceramic material. In this regard, the preceramic polymer can be a silicon-based polymer that is convertible to a silicon-carbon ceramic material. Such silicon-carbon ceramic materials can include, but are not limited to, silicon carbide (SiC) and silicon-carbon ceramic compounds having one or more elements of nitrogen, boron and oxygen. For example, the ceramic material can be silicon oxycarbide, silicon carbonitride, silicon borocarbonitride or other combinations of silicon and carbon with boron, nitrogen and oxygen.

The silicon-containing preceramic polymer material includes mixed therein an effective amount of dopant particles. The dopant particles enhance formation of at least one of the one or more crystalline polymorphs, relative to the silicon-containing preceramic polymer without the dopant particles, with respect to at least one of:

formation of a selected polymorph of the one or more crystalline polymorphs formed, an amount formed of a selected polymorph of the one or more crystalline polymorphs formed, and a temperature of formation of the one or more crystalline polymorphs.

Thus, the dopant particles can serve one or more functions related to seeding the preceramic polymer material to preferentially form a selected polymorph of the one or more crystalline polymorphs formed, seeding the preceramic polymer material to form more of a selected polymorph of the one or more crystalline polymorphs, and reducing a temperature of formation of the one or more crystalline polymorphs. Without being limited to a specific theory, the dopant particles enhance formation of at least one of the one or more crystalline polymorphs by lowering the thermal activation energy for crystal nucleation of the one or more crystalline polymorphs and/or increasing diffusion and crystal growth of nucleated crystals. Thus, crystal nucleation can initiate at lower temperatures using the dopant particles.

In some examples, the dopant particles are crystal-specific and predominantly have a crystalline structure corresponding to one or more crystalline polymorphs of the silicon-containing ceramic material. In these cases, the dopant particles function as seeds in the preceramic polymer such that upon thermal conversion, the formed ceramic material preferentially adopts the crystalline structure of the dopant particles. Thus, the dopant particles, and more specifically the crystalline structure of the dopant particles, can correspond to a selected one of the crystalline polymorphs of the ceramic material that can be produced in the temperature regime of the thermal conversion. The composition and crystalline structure of the dopant particles can thus be selected in accordance with the crystalline polymorphs of the ceramic material that can be produced in the temperature regime of the thermal conversion.

In one further example, the dopant particles are silicon carbide particles that are predominantly alpha polymorph of silicon carbide. In a given time and temperature regime, the silicon-containing preceramic polymer material, without any dopant particles, tends to form a beta polymorph of silicon carbide. However, dopant particles that are predominantly alpha polymorph of silicon carbide function as seeds such that upon thermal conversion, the formed silicon carbide adopts the alpha polymorph crystalline structure of the dopant particles, although some beta polymorphs of silicon carbide can also form. That is, the silicon carbide particles that are predominantly alpha polymorph of silicon promote the formation of alpha silicon carbide over beta silicon carbide. Thus, in this example, the dopant particles promote formation of a selected polymorph and also increase the amount of the selected polymorph formed. The terms alpha and beta can correspond, respectively, to a hexagonal crystal structure and cubic or diamond cubic crystal structure of silicon carbide, or can alternatively refer to first and second crystalline polymorphs in other ceramic materials or in silicon carbide.

In further examples, the dopant particles enhance formation of at least one of the one or more crystalline polymorphs, relative to the silicon-containing preceramic polymer without the dopant particles, with respect to a temperature of formation of the one or more crystalline polymorphs. Example dopant particles that can alter, or reduce, a temperature of formation of the one or more crystalline polymorphs include, but are not limited to, boron-containing particles, carbon-containing particles, nitride particles, oxide particles or combinations thereof. The carbon-containing particles can be silicon carbide, boron carbide ($B_4C$), nano-diamond, graphite, graphene, activated carbon, carbon nanotubes, or combinations thereof. The nitride particles can be aluminum nitride (AlN), gallium nitride (GaN), silicon nitride ($Si_3N_4$), and boron nitride (BN). The oxide particles can include zinc oxide (ZnO).

The amount of dopant particles that is sufficient to enhance formation of at least one of the one or more crystalline polymorphs can vary depending upon the selected dopant particles, selected silicon-containing preceramic polymer and time, temperature, and atmosphere of the thermal conversion, all of which can be determined experimentally given the teachings of this disclosure.

In some examples, the preceramic polymer includes up to about 40% by weight of the dopant particles. However, at such relatively high levels, the dopant particles can affect properties of the ceramic material in ways other than enhancing formation of at least one of the one or more crystalline polymorphs. For example, the dopant particles can influence environmental stability, serve as reinforcement or both, which may or may not be desired. Preferably, to reduce or limit other property contributions of the dopant particles to the ceramic material, lower dopant amounts are used. In this regard, the amount of dopant particles in the preceramic polymer can be less than 20%, less than 10%, or even less than 5% to reduce or limit other property contributions of the dopant particles. In further examples, the amount of dopant particles in the preceramic polymer is 0.05-1% to enhance formation of at least one of the one or more crystalline polymorphs without substantially providing a reinforcement contribution or affecting other properties of the ceramic material.

The upper limit of the amount of dopant particles that can be used in the preceramic polymer can relate to the viscosity of the preceramic polymer precursor. Generally, the dopant particles increase the viscosity of the preceramic polymer precursor and thus can limit flow of the preceramic polymer, such as infiltration flow into a porous structure or fiber structure in a polymer infiltration and pyrolysis process. In some examples, however, if the viscosity is higher than desired, the viscosity can be reduced by the addition of a compatible solvent to the preceramic polymer or by addition of a lower molecular weight version of the same or different polymer, for example.

The lower end of the range of dopant particles can be determined by the enhancement effect on formation of at least one of the one or more crystalline polymorphs. For instance, the preceramic polymer, free of any dopant particles, can be converted to a ceramic material under a given temperature and time to determine a baseline microstructure that can then be compared to one or more samples that contain dopant particles in selected amounts, to determine a minimum amount of dopant particles to obtain a desired effect. The minimum amount of dopant particles can be determined by analytical methods including X-ray scattering techniques. In a further example, the effective amount of dopant particles is the amount needed to cause an increase of at least 1% in crystallinity over the baseline under a given thermal conversion temperature and time.

In further examples, the preceramic polymer is used in combination with one or more other materials in a composite structure. An example composite structure is a ceramic matrix composite wherein the ceramic material formed from the preceramic polymer serves as a matrix with respect to a dispersed phase or structure. The dispersed phase or structure can include, but is not limited to, porous bodies and fiber structures. An example fiber structure is a woven or non-woven fiber structure, but other fiber structures could also be used. In one example, a fiber structure of silicon carbide fibers is useful in gas turbine engine articles.

Some dispersed phases or structures, such as silicon carbide fibers, are sensitive to the thermal conversion conditions of the preceramic polymer. For example, a conversion temperature above 1600° C. is needed to convert certain preceramic polymers to predominantly crystalline silicon carbide, but such a temperature thermally damages many commercially available silicon carbide fibers. Thermal damage can manifest as evaporative loss, chemical reaction or reduction in properties, such as fiber strength. In this regard, the dopant particles also enable mitigation of thermal damage to fibers or other dispersed phases or structures.

FIG. 1 shows a graphical representation of a shifting effect of the dopant particles on the thermal conversion of the preceramic polymer. The percent crystallinity of the ceramic material, without any dopant particles, is a function, represented at F1, of a temperature and time at which the silicon-containing preceramic polymer material is thermally converted. Generally, for a given time, percent crystallinity increases with increased temperature. The thermal damage to dispersed phases or structures, such as silicon carbide fibers, is also a function, represented at F2, of the temperature and time at which the silicon-containing preceramic polymer material is thermally converted. Generally, for a given time, thermal damage increases with increased temperature. Thus, for a selected conversion temperature and time, there is a balance between the percent crystallinity and the degree of thermal damage.

The dopant particles shift upwards the function F1 of the percent crystallinity to the line represented at F1'. For example, by promoting or accelerating the formation of the selected crystalline polymorph, the percent crystallinity increases in comparison to the percent crystallinity without the dopant particles. Thus, the dopant particles provide a new balance between percent crystallinity and thermal damage. For instance, at a given temperature and time, a higher degree of crystallinity can be obtained at an equivalent amount of thermal damage. Alternatively, an equivalent percent crystallinity can be obtained at a lower temperature (i.e., 1500° C. or less versus 1600° C. or greater), with less thermal damage, or a greater crystallinity can be obtained at a higher temperature, with equivalent thermal damage. Shorter times could also be used to achieve equivalent crystallinity with less thermal damage, or longer times could be used to achieve greater crystallinity with equivalent thermal damage. Thus, silicon-containing ceramic materials having increased crystallinity, and in turn better properties, can be obtained. In the case of composites of silicon-containing ceramic materials and dispersed phases or structures, better properties can be obtained through increased crystallinity and/or reduction in thermal damage to the dispersed phases or structures.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method for providing a crystalline ceramic material, the method comprising:
   providing a silicon-containing preceramic polymer material that can be thermally converted to a silicon-containing ceramic material containing one or more crystalline polymorphs, the silicon-containing preceramic polymer material including dispersed therein an effective amount of dopant particles, wherein the dopant particles are either carbon-containing particles that are selected from the group consisting of boron carbide, nano-diamond, graphite, graphene, activated carbon, carbon nanotubes, and combinations thereof or nitride particles selected from the group consisting of gallium nitride, boron nitride, silicon nitride, and combinations thereof; and
   thermally converting the silicon-containing preceramic polymer material to the silicon-containing ceramic material, the effective amount of dopant particles enhancing the formation of at least one of the one or more crystalline polymorphs, relative to the silicon-containing preceramic polymer without the dopant particles, with respect to at least one of:
   formation of a selected polymorph of the one or more crystalline polymorphs formed,
   an amount formed of a selected polymorph of the one or more crystalline polymorphs formed, and
   a temperature of formation of the one or more crystalline polymorphs.

2. The method as recited in claim 1, wherein the silicon-containing ceramic material is silicon carbide.

3. The method as recited in claim 1, wherein the silicon-containing ceramic material is a silicon-carbon ceramic compound including an element selected from the group consisting of nitrogen, boron, oxygen and combinations thereof.

4. The method as recited in claim 1, wherein the silicon-containing preceramic polymer material includes, by weight, up to 40% of the dopant particles.

5. The method as recited in claim 1, wherein the silicon-containing preceramic polymer material includes, by weight, up to 20% of the dopant particles.

6. The method as recited in claim 1, wherein the silicon-containing preceramic polymer material includes, by weight, up to 10% of the dopant particles.

7. The method as recited in claim 6, wherein the silicon-containing preceramic polymer material includes, by weight, up to 5% of the dopant particles.

8. The method as recited in claim 1, wherein the silicon-containing ceramic material is silicon carbide, the silicon-containing preceramic polymer material includes, by weight, up to 10% of the dopant particles, and the silicon-containing preceramic polymer material is disposed within pores of a silicon carbide fiber structure.

9. The method as recited in claim 1, wherein the dopant particles are the carbon-containing particles and are selected from the group consisting of nano-diamond, graphite, graphene, activated carbon, carbon nanotubes, and combinations thereof.

10. The method as recited in claim 9, wherein the silicon-containing preceramic polymer material includes, by weight, up to 5% of the dopant particles.

11. The method as recited in claim 1, wherein the dopant particles are the nitride particles and are selected from the group consisting of gallium nitride, boron nitride, and combinations thereof.

12. The method as recited in claim 11, wherein the silicon-containing preceramic polymer material includes, by weight, up to 5% of the dopant particles.

* * * * *